US012771264B2

(12) United States Patent
Miyazaki

(10) Patent No.: US 12,771,264 B2
(45) Date of Patent: Oct. 20, 2026

(54) INVERTER CIRCUIT AND ELECTRIC FIELD COUPLING NON-CONTACT POWER FEEDING DEVICE

(71) Applicant: SUMIDA CORPORATION, Tokyo (JP)

(72) Inventor: Hiroyuki Miyazaki, Natori City (JP)

(73) Assignee: SUMIDA CORPORATION (JP)

( * ) Notice: Subject to any disclaimer, the term of this patent is extended or adjusted under 35 U.S.C. 154(b) by 422 days.

(21) Appl. No.: 18/285,470

(22) PCT Filed: Jan. 26, 2022

(86) PCT No.: PCT/JP2022/002934

§ 371 (c)(1),
(2) Date: Mar. 6, 2024

(87) PCT Pub. No.: WO2022/269966

PCT Pub. Date: Dec. 29, 2022

(65) Prior Publication Data

US 2025/0309785 A1 Oct. 2, 2025

(30) Foreign Application Priority Data

Jun. 21, 2021 (JP) ................................ 2021-102268

(51) Int. Cl.
*H02M 7/5383* (2007.01)
*H02M 7/48* (2007.01)

(52) U.S. Cl.
CPC ..... *H02M 7/53832* (2013.01); *H02M 7/4815* (2021.05)

(58) Field of Classification Search
CPC ........................ H02M 7/53832; H02M 7/4815
See application file for complete search history.

(56) References Cited

U.S. PATENT DOCUMENTS 4,520,255 A 5/1985 Bredenkamp et al.
7,164,253 B2 1/2007 Sato et al.
(Continued)

FOREIGN PATENT DOCUMENTS

CN 108574421 A 9/2018
JP S58-165295 A 9/1983
(Continued)

OTHER PUBLICATIONS

European Search Report issued in the corresponding European Patent Application No. 22827890.9; dated Apr. 29, 2025 (total 10 pages).

(Continued)

*Primary Examiner* — Jue Zhang
(74) *Attorney, Agent, or Firm* — Harness, Dickey & Pierce, P.L.C.

(57) ABSTRACT

An inverter circuit includes a primary-side circuit having a plurality of self-excited oscillator circuits connected to a DC power supply and a secondary-side circuit for outputting multi-phase AC power in accordance with oscillation of the plurality of self-excited oscillator circuits. Each of the plurality of self-excited oscillator circuits includes a power transmission coil, a resonant capacitor, a pair of switching elements, a drive coil, and a phase-shift filter. A voltage is applied to each control electrode of the pair of switching elements from the drive coil of another self-excited oscillator circuit. The phase of the voltage applied to each control electrode of the pair of switching elements is shifted by a phase-shift amount corresponding to number of phases of the multi-phase AC power for each self-excited oscillator circuit according to at least an action of the phase-shift filter.

5 Claims, 7 Drawing Sheets

(56) References Cited

U.S. PATENT DOCUMENTS

| | | | | |
|---|---|---|---|---|
| 2011/0051468 | A1* | 3/2011 | Kyono | H02M 3/285 363/21.02 |
| 2021/0006169 | A1 | 1/2021 | Miyazaki | |

FOREIGN PATENT DOCUMENTS

| | | | |
|---|---|---|---|
| JP | H05-090897 | U | 12/1993 |
| JP | 3797361 | B2 | 7/2006 |
| JP | 2012175880 | A | 9/2012 |
| JP | 2015204636 | A | 11/2015 |
| JP | 2021013216 | A | 2/2021 |

OTHER PUBLICATIONS

International Search Report (English and Japanese) and Written Opinion (English and Japanese) issued in PCT/JP2022/002934, mailed Mar. 29, 2022; ISA/JP (7 Pages).

* cited by examiner

INVERTER CIRCUIT AND ELECTRIC FIELD COUPLING NON-CONTACT POWER FEEDING DEVICE

CROSS REFERENCE TO RELATED APPLICATIONS

This application is a U.S. National Phase Application under 35 U.S.C. 371 of International Application No. PCT/JP2022/002934, filed on Jan. 26, 2022, which claims priority to Japanese Patent Application No. 2021-102268, filed on Jun. 21, 2021. The entire disclosures of the above applications are expressly incorporated by reference herein.

TECHNICAL FIELD

The present invention relates to circuit technology for outputting self-excited oscillator type multi-phase AC power.

BACKGROUND ART

In a case where three-phase AC output is obtained for motor control or the like, a method using rotation of a coil or a magnet or a separately-excited type circuit is generally used.

JP 3797361 B2 discloses a motor drive control device including a converter that converts an output voltage from a DC power supply into a voltage and supplies the voltage to an inverter, and a control unit that controls a current supplied to a motor by performing PWM control on the inverter. This method can be regarded as a method using a separately-excited type circuit because the control unit performs PWM control of the inverter.

However, there is a problem in the above-described general method for obtaining the multi-phase AC output. For example, a method using the rotation of a coil or a magnet has a problem in that only low-frequency alternating current that depends on the commercial power frequency of 50 Hz (Hertz) or 60 Hz can be output, and a method using a separately-excited circuit has a problem in that the number of circuit parts increases and control becomes complicated.

The present invention has been made in view of such circumstances, and provides circuit technology capable of outputting high-frequency multi-phase AC power with a simple circuit configuration.

SUMMARY

According to the present invention, there is provided an inverter circuit comprising: a primary-side circuit including a plurality of self-excited oscillator circuits connected to a DC power supply; and a secondary-side circuit configured to output multi-phase AC power having phases different from each other according to oscillation of the plurality of self-excited oscillator circuits; wherein each of the plurality of self-excited oscillator circuits includes: a power transmission coil; a resonant capacitor constituting a resonant circuit together with the power transmission coil; a pair of switching elements connected to the power transmission coil; a drive coil configured to generate an induced electromotive force having a frequency corresponding to a resonance frequency of the resonant circuit, the drive coil applying a voltage to each control electrode of the pair of switching elements of another self-excited oscillator circuit according to the induced electromotive force; and a phase-shift filter; the secondary-side circuit includes a plurality of power reception coils, each of which is magnetically coupled to the power transmission coil of each of the plurality of self-excited oscillator circuits; a voltage is applied to each control electrode of the pair of switching elements from the drive coil of another self-excited oscillator circuit, and the phase of the voltage applied to each of the control electrodes of the pair of switching elements of said another self-excited oscillator circuit is shifted by a phase-shift amount corresponding to a number of phases of the output power for each self-excited oscillator circuit according to at least an action of the phase-shift filter.

Effect of the Invention

With the present invention, it is possible to provide a circuit technology capable of outputting high-frequency multi-phase AC power with a simple circuit configuration.

DETAILED DESCRIPTION

In the following, examples of preferred embodiments of the present invention (hereinafter, referred to as the present embodiments) will be described. Note that the following embodiments are examples, and the present invention is not limited to the configurations of the following embodiments.

First Embodiment

Figure 1:
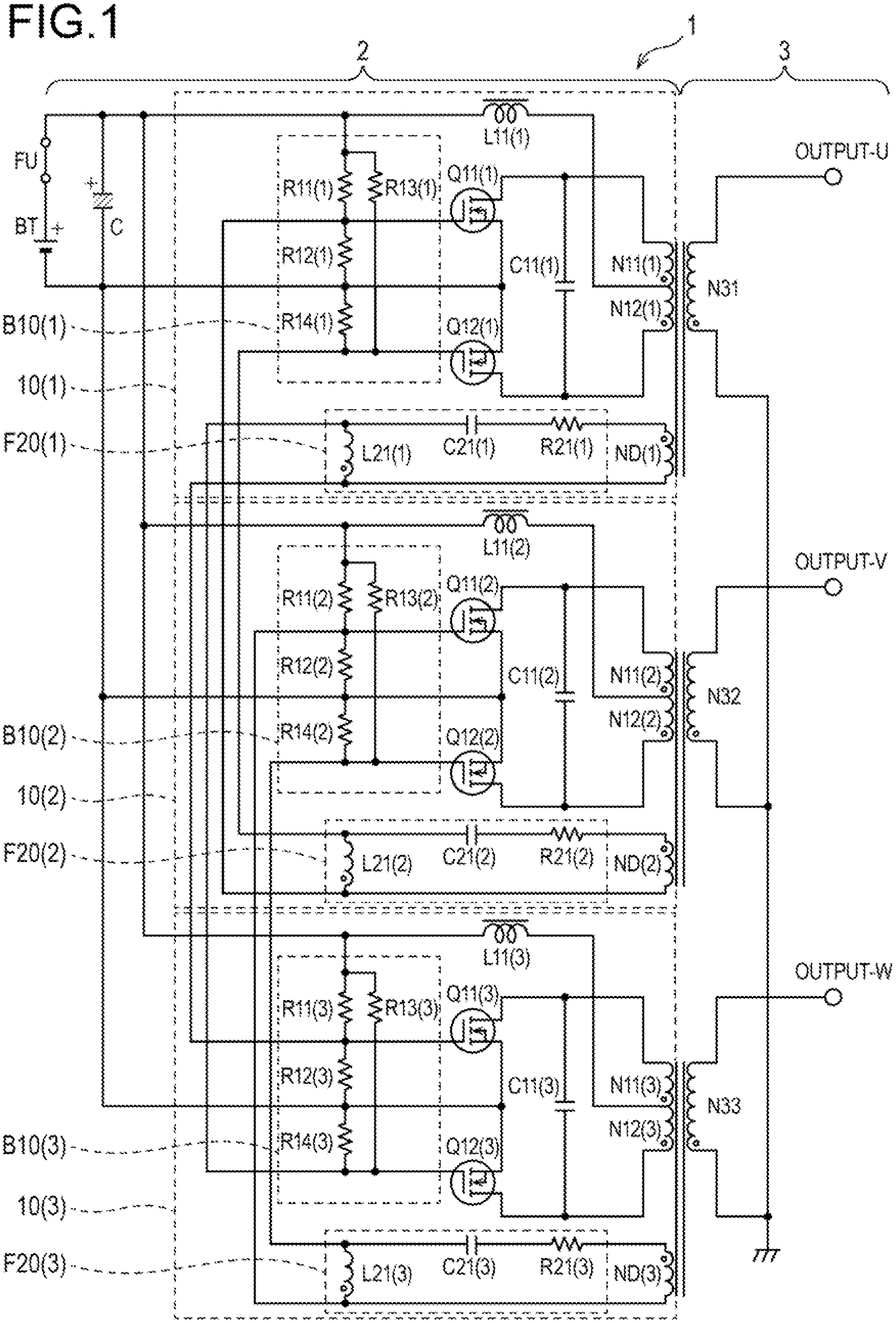
FIG. 1 is a circuit diagram of an inverter circuit according to a first embodiment.

FIG. 1 is a circuit diagram of an inverter circuit 1 according to a first embodiment.

The inverter circuit 1 includes a primary-side circuit 2 having a battery device BT and a secondary-side circuit 3 that, by magnetic coupling with the primary-side circuit 2, outputs multi-phase AC power having phases different from each other. In the first embodiment, an example is shown in which the battery device BT is a battery device that supplies DC power, and three-phase AC power is output from the secondary-side circuit 3.

[Primary-Side Circuit]

The primary-side circuit 2 further includes three self-excited oscillator circuits 10(1), 10(2), and 10(3) that are connected in parallel to the battery device BT.

In the example of FIG. 1, each of the self-excited oscillator circuits 10(1), 10(2), and 10(3) has the same configuration, and constitutes a collector resonant type self-excited oscillator circuit.

Specifically, the self-excited oscillator circuit 10(1) includes power transmission coils N11(1) and N12(1), a resonant capacitor C11(1), transistors Q11(1) and Q12(1) as a pair of switching elements, a bias circuit B10(1), a drive coil ND(1), a phase-shift filter F20(1), and the like, the self-excited oscillator circuit 10(2) includes power transmission coils N11(2) and N12(2), a resonant capacitor C11(2), transistors Q11(2) and Q12(2) as a pair of switching elements, a bias circuit B10(2), a drive coil ND(2), a phase-shift filter F20(2), and the like, and the self-excited oscillator circuit 10(3) includes power transmission coils N11(3) and N12(3), a resonant capacitor C11(3), transistors Q11(3) and Q12(3) as pairs of switching elements, a bias circuit B10(3), a drive coil ND(3), a phase-shift filter F20(3), and the like.

In the following description, reference numerals without parentheses are used to indicate any one of the self-excited oscillator circuits or the constituent elements thereof unless necessary to distinguish between them. In addition, the self-excited oscillator circuit 10 may be abbreviated as circuit 10.

The power transmission coil N11 and the power transmission coil N12 are connected in series via an intermediate tap, and the intermediate tap is connected to a positive terminal of the battery device BT via an input coil L11. Hereinafter, in a case of expressing one end of the power transmission coil N11 or one end of the power transmission coil N12, means one end of the power transmission coils N11 and N12 on the side opposite to the intermediate tap side.

One end of the power transmission coil N11 is connected to a negative terminal of the battery device BT via the transistor Q11, and one end of the power transmission coil N12 is connected to the negative terminal of the battery device BT via the transistor Q12.

The resonant capacitor C11 is connected in parallel to the power transmission coils N11 and N12, and constitutes a resonant circuit together with the power transmission coils N11 and N12.

The transistors Q11 and Q12 are field effect transistors (FETs) and can be referred to as a pair of switching elements. A drain of the transistor Q11 is connected to one end of the power transmission coil N11, and a drain of the transistor Q12 is connected to one end of the power transmission coil N12. Sources of the transistors Q11 and Q12 are connected to the negative terminal of the battery device BT. The gates of the transistors Q11 and Q12 are connected to the bias circuit B10.

The bias circuit B10 includes resistance elements R11, R12, R13, and R14. The bias circuit B10 is connected in parallel to the battery device BT, and applies a bias voltage to the gates of the transistors Q11 and Q12.

The drive coil ND is provided to be magnetically coupled to the power transmission coils N11 and N12. For example, the drive coil ND is formed as an auxiliary winding on the primary side of the same transformer as power transmission coils N11 and N12. In the present embodiment, the drive coil ND is magnetically coupled so that the polarity is opposite to that of the power transmission coils N11 and N12, and an inverse electromotive force of the oscillation frequency generated in the power transmission coils N11 and N12 is generated in the drive coil ND. However, the polarity of the drive coil ND is not limited to the example of FIG. 1 as described later.

In addition, the drive coil ND is provided so that a voltage may be applied to each control electrode of the pair of switching elements of another circuit 10 according to the electromotive force. Specifically, one end of the drive coil ND(1) is connected to the gate (control electrode) of the transistor Q11(3) of the circuit 10(3), and the other end of the drive coil ND(1) is connected to the gate (control electrode) of the transistor Q12(3) of the circuit 10(3). In addition, one end of the drive coil ND(2) is connected to the gate (control electrode) of the transistor Q11(1) of the circuit 10(1), and the other end of the drive coil ND(2) is connected to the gate (control electrode) of the transistor Q12(1) of the circuit 10(1). Moreover, one end of the drive coil ND(3) is connected to the gate (control electrode) of the transistor Q11(2) of the circuit 10(2), and the other end of the drive coil ND(3) is connected to the gate (control electrode) of the transistor Q12(2) of the circuit 10(2).

In the present embodiment, the power transmission coil N11(1), the power transmission coil N12(1), and the drive coil ND(1) in the circuit 10(1), together with a power reception coil N31 of the secondary-side circuit 3, constitute a transformer (first transformer), the power transmission coil N11(2), the power transmission coil N12(2), and the drive coil ND(2) in the circuit 10(2), together with a power reception coil N32 of the secondary-side circuit 3, constitute a transformer (second transformer), and the power transmission coil N11(3), the power transmission coil N12(3), and the drive coil ND(3) in the circuit 10(3), together with a power reception coil N33 of the secondary-side circuit 3, constitute a transformer.

In this way, in the present embodiment, the primary-side circuit 2 and the secondary-side circuit 3 are electrically insulated from each other, and are configured to be capable of transmitting power from the primary-side circuit 2 to the secondary-side circuit 3 by electromagnetic induction of the first transformer, the second transformer, and the third transformer.

The phase-shift filter F20 is provided between the drive coil ND in the same circuit 10 and the gates (control electrodes) of the transistors Q11 and Q12 of another circuit 10. Specifically, the phase-shift filter F20(1) is provided between the drive coil ND(1) of the circuit 10(1) and the gates (control electrodes) of the transistors Q11(3) and Q12(3) of the circuit (3), the phase-shift filter F20(2) is provided between the drive coil ND(2) of the circuit 10(2) and the gates (control electrodes) of the transistors Q11(1) and Q12(1) of the circuit (1), and the phase-shift filter F20(3) is provided between the drive coil ND(3) of the circuit 10(3) and the gates (control electrodes) of the transistors Q11(2) and Q12(2) of the circuit (2).

The phase-shift filter F20 is configured such that a phase of the voltage applied to each gate of the transistors Q11 and Q12, which are connected to the phase-shift filter F20, of another circuit 10 advances or lags behind the oscillation phase of the circuit 10 to which the phase-shift filter F20 belongs by a phase-shift amount corresponding to the number of phases of the output power. In a case of a three-phase AC output as in the present embodiment, a filter constant of the phase-shift filter F20 is set such that the phase of the voltage applied to each gate of the transistors Q11 and Q12 of each circuit 10 is delayed by 120 degrees with respect to the oscillation phase of another circuit 10. In addition, although different from the present embodiment, in a case of the six-phase AC output, the filter constant is set such that the phase of the voltage applied to each gate of the transistors Q11 and Q12 of each circuit 10 is delayed by 60 degrees with respect to the oscillation phase of another circuit 10.

As will be described later, the filter constant (circuit constant) of the phase-shift filter F20 is also set in association with the polarity of the drive coil ND.

As described above, in the present embodiment, the AC voltage induced in the drive coil ND is shifted in phase by the phase-shift filter F20, and is applied to each gate of the transistors Q11 and Q12 of another circuit 10. As a result, the phase of the voltage applied to each gate of the transistors Q11 and Q12 of the other circuit 10 is shifted by a phase-shift amount corresponding to the number of phases of the output power for each circuit 10 according to the action of the phase-shift filter F20, the polarity of the drive coil ND, and the like.

Thus, in the present embodiment, it is possible to output three-phase AC power having phases different from each other by 120 degrees (instantaneous value becomes 0) from the secondary-side circuit 3.

The phase-shift filter F20 in the present embodiment includes a resistance element R21, a coil L21, and a capacitor C21, and may also be referred to as an RLC filter. The resistance element R21 and the capacitor C21 are connected in series to the drive coil ND, and the coil L21 is connected in parallel to the drive coil ND.

With such a configuration, the phase-shift filter F20 constitutes a low-pass filter, and acts to delay the phase of the AC voltage generated in the drive coil ND.

As described above, the phase-shift amount by the phase-shift filter F20 in the present embodiment may be changed by adjusting the filter constant of the phase-shift filter F20 such as a resistance value of the resistance element R21, an inductance of the coil L21, or a capacitance of the capacitor C21.

In addition to the above-described configuration, the primary-side circuit 2 includes a fuse FU and a capacitor C.

The fuse FU disconnects the battery device BT from the primary-side circuit 2 when an excessive current is generated due to an abnormality in the circuit 10 of the primary-side circuit 2. As a result, abnormal heating of the battery device BT due to an excessive current may be prevented.

The capacitor C absorbs a change in voltage due to charging and discharging of the battery device BT.

[Secondary-Side Circuit]

The secondary-side circuit 3 includes power reception coils N31, N32, N33, and the like.

As described above, the power reception coil N31 constitutes a transformer used as the secondary-side coil with the power transmission coils N11(1) and N12(1) of the primary-side circuit 2 as the primary-side coils, and an induced electromotive force is generated by the current in the power transmitting coil N11(1) or N12(1).

As described above, the power reception coil N32 constitutes a transformer used as the secondary-side coil with the power transmission coils N11(2) and N12(2) of the primary-side circuit 2 as primary-side coils, and an induced electromotive force is generated by the current in the power transmitting coil N11(2) or N12(2).

As described above, the power reception coil N33 constitutes a transformer used as the secondary-side coil with the power transmission coils N11(3) and N12(3) of the primary-side circuit 2 as the primary-side coils, and an induced electromotive force is generated by the current in the power transmitting coil N11(3) or N12(3).

The power reception coils N31, N32, and N33 are connected by a Y connection (star connection).

As described above, the phases of the AC voltages induced in power reception coils N31, N32, and N33 are shifted from each other by 120 degrees by the action of the phase-shift filter F20, and three-phase AC power is output from the terminals (OUTPUT-U, OUTPUT-V, OUTPUT-W) connected to the power reception coils N31, N32, and N33, respectively.

Hereinafter, the operation of the inverter circuit 1 in the first embodiment having the above-described configuration will be described.

In the circuit 10(1), when DC power is supplied from the battery device BT to the bias circuit B10(1), a voltage divided by the resistance elements R11(1) and R12(1) is applied as a bias voltage to the gate of the transistor Q11(1), and a voltage divided by the resistance elements R13(1) and R14(1) is applied as a bias voltage to the gate of the transistor Q12. As a result, either the transistor Q11(1) or the transistor Q12(1) is turned ON first depending on the transistor characteristics and the resistance values of the resistance elements R11(1) and R13(1).

At this time, in a case where the transistor Q11(1) is turned ON, a current flows through the power transmission coil N11, and a current flows between the drain and the source of the transistor Q11(1).

When a current flows through the power transmission coil N11(1) as a primary winding, a magnetic field is generated in the first transformer, and an induced electromotive force is generated in the power reception coil N31 as a secondary winding. The induced electromotive force generated in the power reception coil N31 can be amplified according to the winding ratio between the power transmission coil N11(1) and the power reception coil N31.

When a magnetic field is generated in the first transformer, an inverse electromotive force is also generated by self-induction in the drive coil ND(1), which is a primary winding.

Such an operation is similarly performed in each of the circuit 10(2) and the circuit 10(3), and the AC voltage is similarly induced in the drive coil ND(3) of the circuit 10(3) and the drive coil ND(2) of the circuit 10(2) by the magnetic fields generated in the second transformer and the third transformer.

When an AC voltage is induced in the drive coil ND(2) of the circuit 10(2), a negative voltage is applied to the transistor Q11(1) of the circuit 10(1), the bias voltage applied to the transistor Q11(1) becomes equal to or less than a threshold voltage, and the transistor Q11(1) is turned OFF. On the other hand, a positive voltage is applied to the transistor Q12(1), the bias voltage applied to the transistor Q12(1) exceeds a threshold voltage, and the transistor Q12 (1) is turned ON. As a result, the ON/OFF states of the transistors Q11(1) and Q12(1) are inverted.

When the transistor Q11(1) is turned OFF and the transistor Q12(1) is turned ON, a current flows through the power transmission coil N12(1), and a current flows between the drain and the source of the transistor Q12(1).

When a current flows through the power transmission coil N12(1) as a primary winding, a magnetic field is generated in the first transformer, and an induced electromotive force is generated in the power reception coil N31 as a secondary winding.

As described above, in each circuit 10, the ON state and the OFF state of the transistors Q11 and Q12 are alternately repeated, and thus currents having different directions flow alternately through the power transmission coils N11 and N12, which are the primary windings.

Here, although each circuit 10 oscillates independently of each other, each circuit 10 oscillates at the same frequency because the oscillation frequency of each circuit 10 shares the oscillation timing with the drive coil ND. However, in the present specification, the expression "the same frequency" or "identical frequency" is used in a meaning that includes a slight difference in frequency considered in the technical field of electronic circuits in addition to the meaning of the frequencies completely matching.

On the other hand, the phase of the voltage applied to the gates of the transistors Q11 and Q12 of each circuit 10 is delayed by a phase-shift amount (120 degrees in the case of the three-phase AC output) corresponding to the number of phases of the output power with respect to the phase of the voltage generated in the power transmission coil N11 or N12 of the other circuit 10, that is, the oscillation phase of the other circuit 10 due to the action of the phase-shift filter F20 connected to the gate, the polarity of the drive coil ND, and the like. As a result, in the present embodiment, the phase of the voltage applied to the gates of the transistors Q11(1) and Q12(1) of the circuit 10(1) is delayed by 120 degrees with respect to the oscillation phase of the circuit 10(2), the phase of the voltage applied to the gates of the transistors Q11(2) and Q12(2) of the circuit 10(2) is delayed by 120 degrees with respect to the oscillation phase of the circuit 10(3), and the phase of the voltage applied to the gates of the transistors Q11(3) and Q12(3) of the circuit 10(3) is delayed by 120 degrees with respect to the oscillation phase of the circuit 10(1).

Thus, the ON/OFF timings of the transistors Q11 and Q12 are shifted in each circuit 10, and the oscillation phases of the circuits 10 are shifted by 120 degrees. As a result, the phases of the AC voltages induced in the power reception coils N31, N32, and N33 are also shifted from each other by 120 degrees, and three-phase AC power is output.

Therefore, according to the present embodiment, high-frequency three-phase AC power may be output with a simple circuit configuration without requiring complicated control such as control IC. Note that the frequency of the three-phase AC power may be set to a high frequency band of, for example, 100 kHz to 2 MHz (megahertz) according to the inductance or the like of each circuit 10.

Second Embodiment

Figure 2:
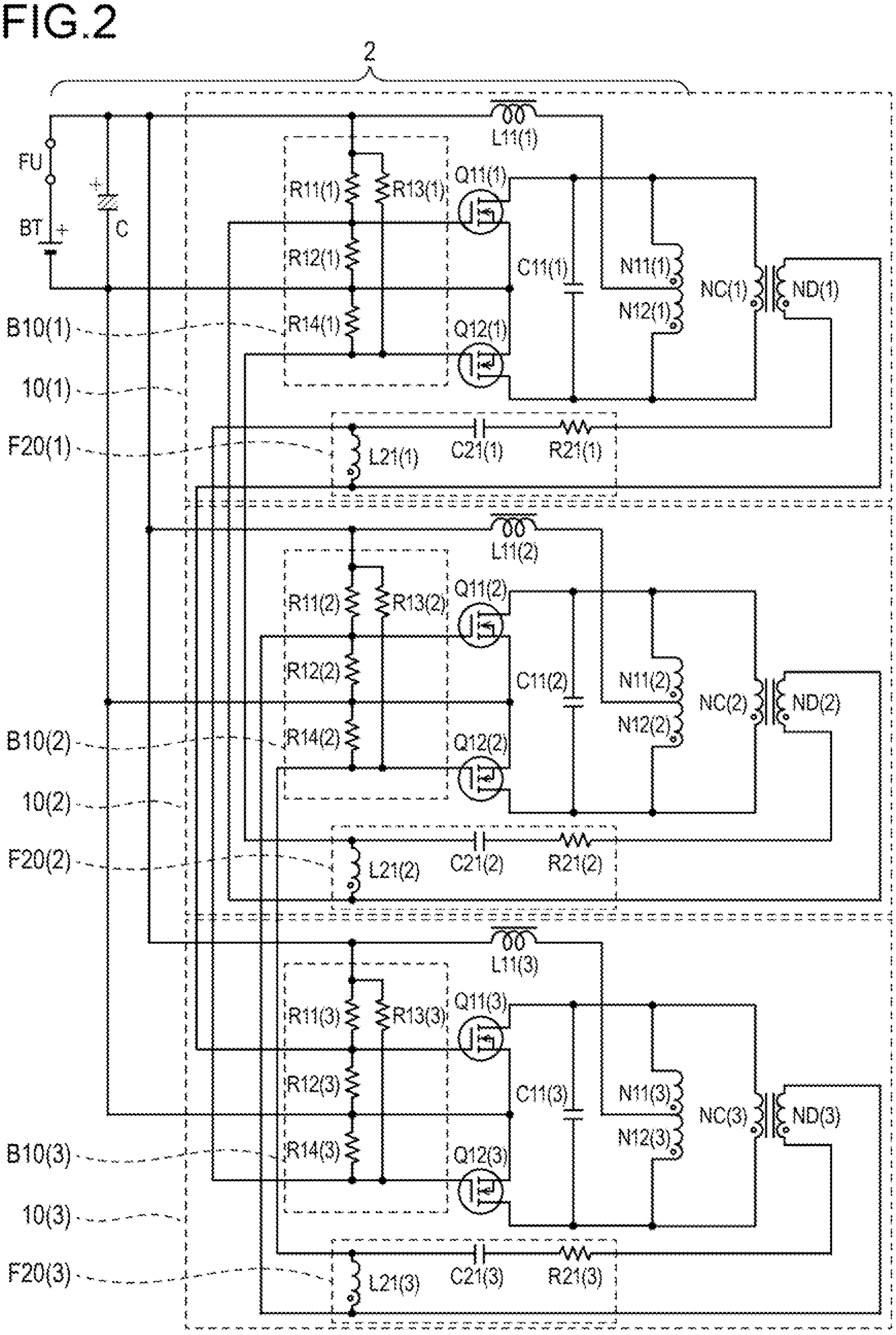
FIG. 2 is a circuit diagram of a primary-side circuit of an inverter circuit according to a second embodiment.

FIG. 2 is a circuit diagram of a primary-side circuit 2 of an inverter circuit 1 according to a second embodiment.

The inverter circuit 1 in the second embodiment is different from that in the first embodiment in that a drive control coil NC is newly provided, and the drive coil ND is magnetically coupled to the drive control coil NC. Hereinafter, the inverter circuit 1 according to the second embodiment will be described focusing on content different from the content of the first embodiment, and content that is the same as the content of the first embodiment will not be repeated.

Each circuit 10 further includes a drive control coil NC.

As illustrated in FIG. 2, the drive control coil NC is connected in parallel to the power transmission coils N11 and N12 and the resonant capacitor C11. Specifically, one end of the drive control coil NC is connected to one end of the power transmission coil N11, one end of the resonant capacitor C11, and the drain of the transistor Q11, and the other end of the drive control coil NC is connected to one end of power transmission coil N12, the other end of the resonant capacitor C11, and the drain of the transistor Q12.

However, the drive control coil NC is not limited to the configuration of FIG. 2, and may be connected in parallel to the resonant capacitor C11 or the power transmission coils N11 and N12 constituting the resonant circuit in the same circuit 10, or may be connected in parallel to the power reception coils 31, 32, or 33 that are magnetically coupled to the power transmission coils N11 and N12 in the same circuit 10.

Further, the drive control coil NC is magnetically coupled to the drive coil ND in the same circuit 10. The drive control coil NC and the drive coil ND constitute a transformer for drive control, and for example, the transformer is configured such that the drive control coil NC is the primary coil of the transformer and the drive coil ND is the secondary coil of the transformer.

Therefore, in the second embodiment, the drive coil ND is not magnetically coupled to the power transmission coils N11 and N12. That is, each circuit 10 is provided with two types of transformers: a drive control transformer including the drive coil ND and the drive control coil NC; and a main transformer including the power transmission coils N11 and N12 and the power reception coils N31, N32, or N33.

Here, the main transformer is increased in scale in a case of handling large electric power, but the drive control transformer only needs to be able to take gate signal timings of the transistors Q11 and Q12, and thus can be sufficiently achieved by a small transformer.

The polarities of the drive control coil NC and the drive coil ND in the drive control transformer, together with the filter constant of the phase-shift filter F20 connected to the drive coil ND, may be determined such that the phase of the voltage applied to each gate of the transistors Q11 and Q12 via the phase-shift filter F20 is shifted by a phase-shift amount corresponding to the number of phases of the output power with respect to the oscillation phase of the circuit 10 to which the drive control coil NC and the drive coil ND belong. In the example of FIG. 2, the drive control coil NC is provided so as to have the same polarity as the power transmission coils N11 and N12 in the same circuit 10, and is also provided so as to have the same polarity as the drive coil ND in the same circuit 10. However, the polarities of the drive control coil NC and the drive coil ND are not limited to the example of FIG. 2, and the drive control coil NC may be provided so as to have a polarity opposite to those of the power transmission coils N11 and N12 in the same circuit 10, or may be provided so as to have a polarity opposite to that of the drive coil ND.

In the second embodiment, in each circuit 10, an AC voltage is generated at the oscillation frequency of each circuit 10 in the drive control coil NC, and accordingly, an AC voltage of the same frequency is also induced in the drive coil ND that is magnetically coupled to the drive control coil NC. The other circuit operations are the same as those of the first embodiment, and thus a description thereof will not be repeated here.

With the second embodiment, in addition to having the same effects as those of the first embodiment, it is possible to obtain a further effect of improving the degree of freedom in circuit design. Specifically, in the first embodiment, since the drive coil ND constitutes the same transformer as the power transmission coils N11 and N12, it is necessary to design the windings of the power transmission coils N11 and N12 and the drive coil ND while considering the magnitude of the output power and the gate allowable power of the transistors Q11 and Q12; however, by providing the drive control transformer separately from the main transformer, it is only necessary to design the windings of the drive coil ND according to the gate allowable power of the transistors Q11 and Q12 without considering the magnitude of the output power.

Modified Example of Second Embodiment

As described above, in the second embodiment, the phase-shift filter F20 is provided between the drive coil ND and the gates of the transistors Q11 and Q12 of another circuit 10, but may be connected to the drive control coil NC.

Figure 3:
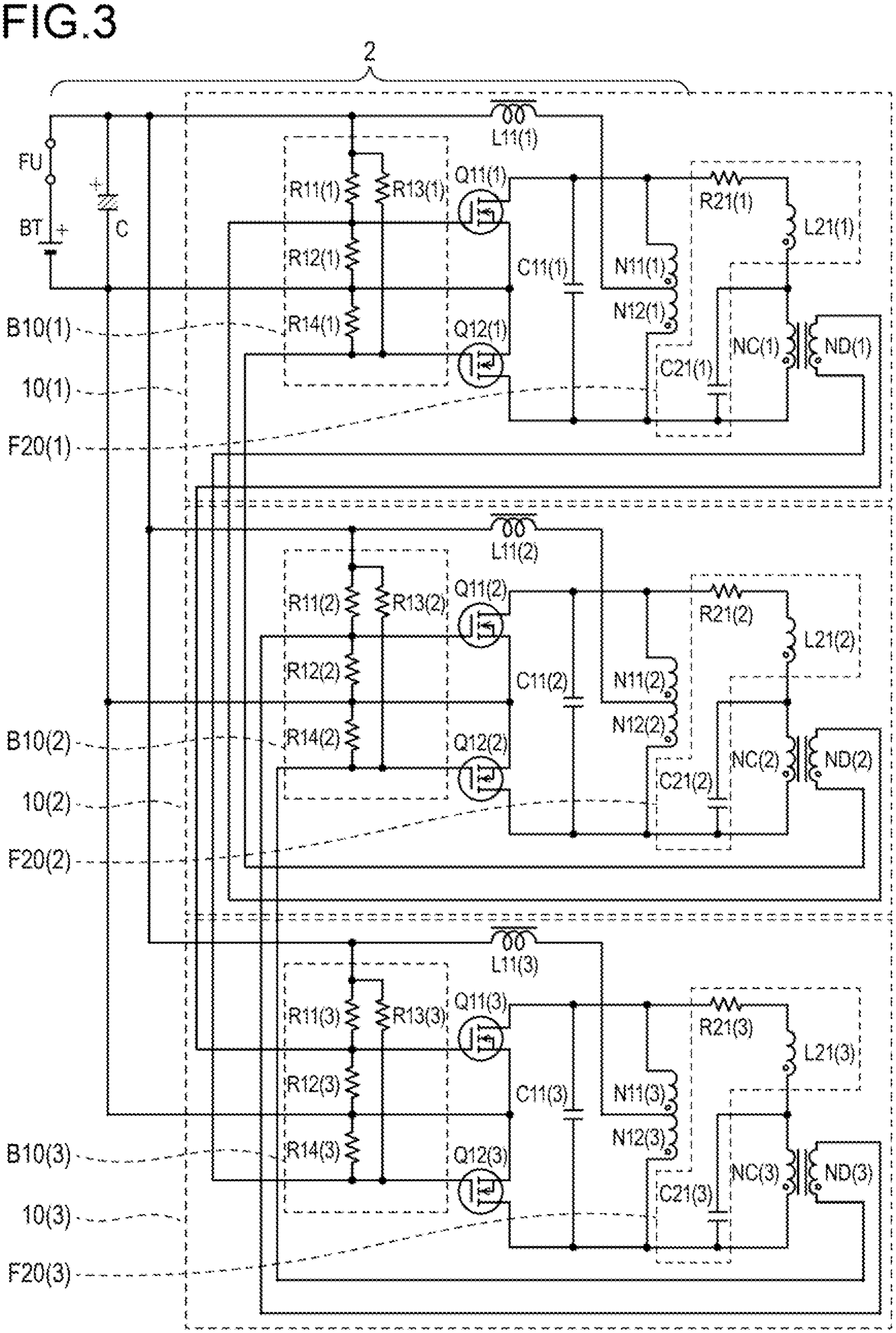
FIG. 3 is a circuit diagram illustrating a modification of the inverter circuit of the second embodiment.

FIG. 3 is a circuit diagram illustrating a modification of the inverter circuit 1 of the second embodiment.

In the present modification, the resistance element R21 and the coil L21 of the phase-shift filter F20 are connected in series with the drive control coil NC, and the capacitor C21 of the phase-shift filter F20 is connected in parallel with the drive control coil NC.

By such a phase-shift filter F20, the AC voltage of which the phase is shifted by the predetermined phase-shift amount with respect to the phase (oscillation phase) of the AC voltage generated in the power transmission coils N11 and N12 in each circuit 10 is induced in the drive control coil NC and the drive coil ND, and as a result, the phase of the voltage applied to the gates of the transistors Q11 and Q12 connected to the drive coil ND is shifted by a phase-shift amount corresponding to the number of phases of the output power with respect to the oscillation phase of the circuit 10.

As described above, the phase shift timing of shifting the phase of the AC voltage induced in the drive coil ND or shifting the phase of the AC voltage generated in the drive control coil NC that is magnetically coupled to the drive coil ND is different between the present modification and the above-described second embodiment.

However, in the present modification, the same effects as those of the second embodiment are obtained.

Modification

The inverter circuit 1 in each of the present embodiments and the modification described above may further include a circuit configuration other than the configuration illustrated in each figure.

In each of the above-described embodiments and modification, a configuration for outputting three-phase AC power has been mainly exemplified; however, as long as the phases are different from each other, the number of phases of the output power is not limited to only three phases, and may be two phases or four or more phases.

In this case, the number of the circuits 10 and the power reception coils may be provided so as to be the same as the number of phases of the output power. In addition, the polarity of the drive coil ND and the circuit constant of the phase-shift filter F20 may be set such that the phase of the voltage applied to each gate of the transistors Q11 and Q12 of each circuit 10 is shifted by a phase-shift amount corresponding to the number of phases of the output power for each circuit. For example, in a case where four-phase AC power is output, the polarity of the drive coil ND, the circuit constant of the phase-shift filter F20, and the like are set so that the phase-shift amount is 90 degrees. In addition, in a case where nine-phase AC power is output, the polarity of the drive coil ND, the circuit constant of the phase-shift filter F20, and the like are set so that the phase-shift amount is 140 degrees.

Further, in each of the above-described embodiments and modification, the circuit configurations in each of the circuits 10 are the same, but the circuit configurations in each of the circuits 10 do not need to be completely the same, and different circuit configurations corresponding to leakage or the like may be included for each of the circuits 10 so that the oscillation conditions or the oscillation frequencies of each of the circuits 10 are substantially the same.

Figure 4:
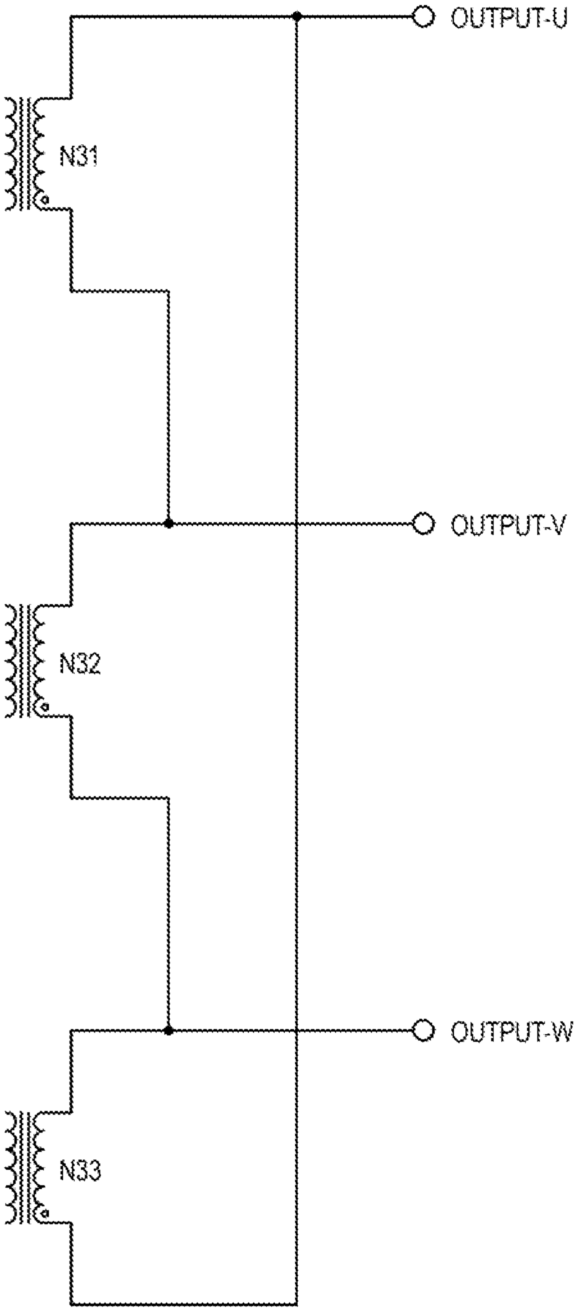
FIG. 4 is a circuit diagram of a secondary-side circuit of an inverter circuit according to a modification.

FIG. 4 is a circuit diagram of the secondary-side circuit 3 of an inverter circuit 1 according to the modification.

In each of the above-described embodiments and modification, an example in which the secondary-side circuit 3 is configured by a Y connection (star connection) of the power reception coils N31, N32, and N33 has been described; however, the power reception coils N31, N32, and N33 may be connected by a delta connection as illustrated in FIG. 4.

Figure 5:
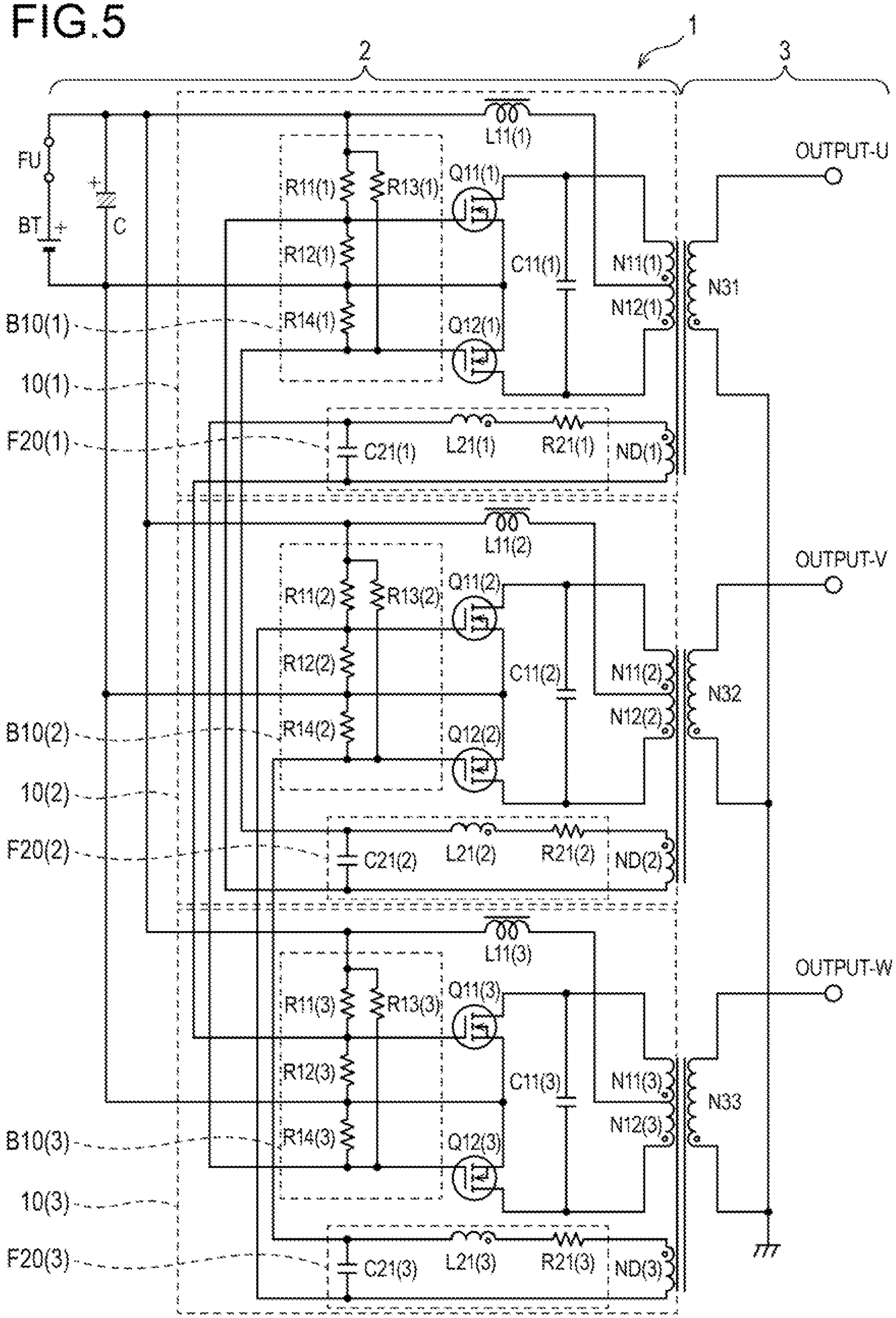
FIG. 5 is a circuit diagram illustrating part of a modification of the inverter circuit of the second embodiment.

FIG. 5 is a circuit diagram illustrating part of a modification of the inverter circuit 1 of the second embodiment.

As illustrated in FIG. 5, in the present modification, the phase-shift filter F20 includes a capacitor C21 connected in parallel to the drive coil ND, and a coil L21 and a resistance element R21 connected in series to the drive coil ND.

According to this modification, the coil L21 of the phase-shift filter F20 may be omitted by using the leakage inductance of the drive control transformer.

Also in this modification, the polarity of the drive coil ND, the circuit constant of the phase-shift filter F20, and the like may be adjusted such that the phase of the voltage applied to each of the gates of the transistors Q11 and Q12 via the phase-shift filter F20 is shifted for each circuit 10 by a phase-shift amount (for example, 120 degrees) corresponding to the number of phases of the output power with respect to the oscillation phase of each circuit 10, and as a result, the same effect as that of the second embodiment may be obtained.

Although FIG. 5 illustrates a modification of the first embodiment, the inverter circuit 1 according to the second embodiment may also be similarly modified.

Application Example

The inverter circuit 1 according to the above-described embodiments and modification may be applied to an electric field coupling non-contact power feeding device.

Figure 6:
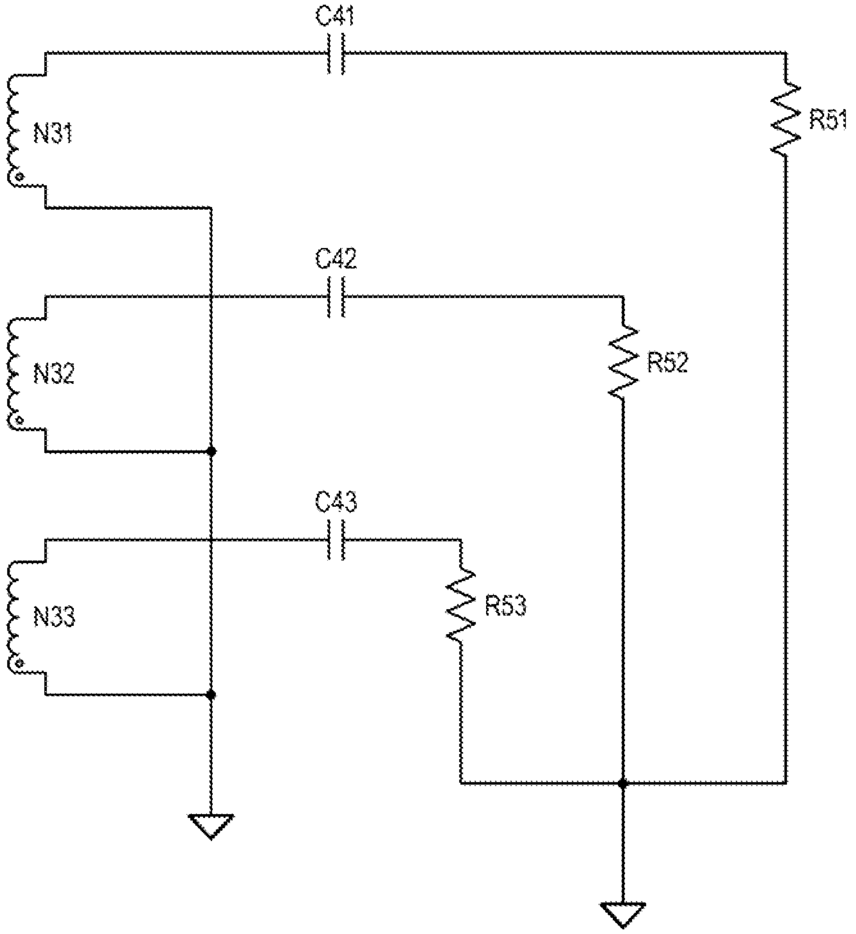
FIG. 6 is a circuit diagram of a secondary-side circuit of an electric field coupling non-contact power feeding device.

FIG. 6 is a circuit diagram of a secondary-side circuit of an electric field coupling non-contact power feeding device.

The electric field coupling non-contact power feeding device illustrated in FIG. 6 achieves three-phase AC output, and coupling electrode plates C41, C42, and C43 are provided in the secondary-side circuit 3. Power is then supplied to loads R51, R52, and R53 via the coupling electrode plates C41, C42, and C43. The primary-side circuit 2 of the electric field coupling non-contact power feeding device may have the same configuration as that of the primary-side circuit 2 of the inverter circuit 1 in each of the above-described embodiments and modification.

In a case where the necessary capacitances are compared under the same condition of the frequency and the voltage between the electrode plates of the coupling electrode plates C41, C42, and C43, the configuration of the three-phase AC output can transmit the same power with a capacitance of 43% as compared with a configuration of a single-phase AC output.

Therefore, with the three-phase AC output electric field coupling non-contact power feeding device illustrated in FIG. 6, the total area of the coupling electrode plates C41, C42, and C43 may be reduced to about half that of the configuration of the single-phase AC output.

Hereinafter, the above-described contents will be described in more detail with reference to an example. However, the description of the following example does not add any limitation to the contents described above.

Examples

Figure 7A:
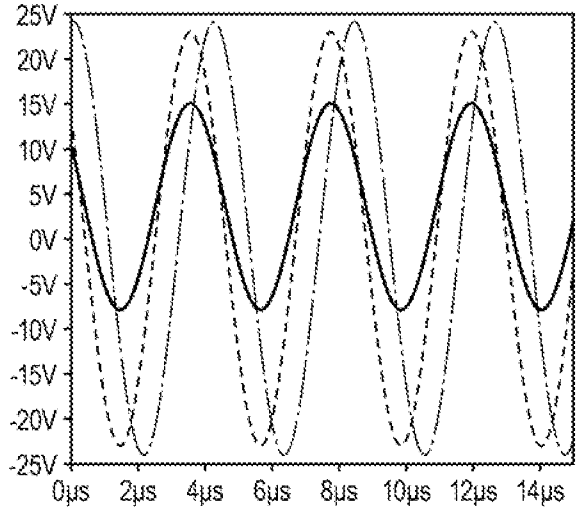
FIGS. 7A-7C are graphs illustrating a result of simulating a voltage change at each point in the inverter circuit according to the first embodiment.
Figure 7B:
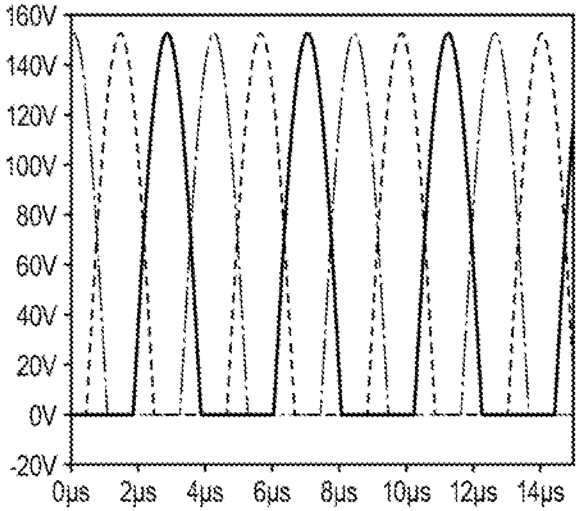
Figure 7C:
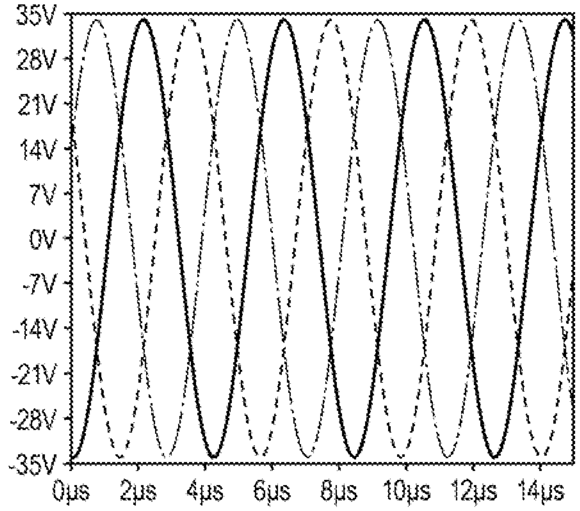

In the example, a result of verifying the effect of the above-described first embodiment by simulation will be described with reference to FIGS. 7A-7C. FIGS. 7A-7C are graphs illustrating a result of simulating a voltage change at each point in the inverter circuit 1 according to the first embodiment.

FIG. 7A illustrates a voltage waveform (one-dot chain line) induced in the drive coil ND(1), a voltage waveform (broken line) generated in the coil L21(1) of the phase-shift filter F20(1), and a voltage waveform (solid line) input to the gate of the transistor Q12(3) via the phase-shift filter F20(1).

According to FIG. 7A, it can be seen that the phase of the voltage generated by the drive coil ND(1) of the circuit 10(1) is shifted by the phase-shift filter F20(1), and the voltage is applied to the gate of the transistor Q12(3) of the circuit 10(3). In the present embodiment, the drive coil ND is magnetically coupled so that the polarity is opposite to that of the power transmission coils N11 and N12, and thus the phase of the AC voltage induced in the drive coil ND(1) is delayed by 180 degrees with respect to the voltage generated in the power transmission coil N11 or N12. Furthermore, in the present example, due to the filter constant of the phase-shift filter F20, the phase of the voltage input to the gate of the transistor Q12(3) via the phase-shift filter F20(1) is advanced by 60 degrees with respect to the voltage induced in the drive coil ND(1).

As a result, as illustrated in FIG. 7B, the voltage input to the gate of the transistor Q12(3) of each circuit 10 has a phase delayed by 120 degrees for each circuit 10.

FIG. 7B illustrates a voltage waveform (output waveform) between the drain and source of the transistors Q12(1), Q12(2), and Q12(3). According to FIG. 7B, it can be seen that the phases of the voltages of the transistors Q12(1), Q12(2), and Q12(3) are shifted by 120 degrees for each circuit 10.

FIG. 7C illustrates an output waveform of the secondary-side circuit 3.

According to FIG. 7C, it can be seen that the three-phase AC power, whose phase is shifted by 120 degrees, is output.

As described above, according to the present example, it has been demonstrated that a self-excited oscillator type inverter circuit capable of outputting three-phase AC power can be achieved.

Although not illustrated, in the inverter circuit 1 in the second embodiment and various modifications described above, it has been demonstrated that a self-excited oscillator type inverter circuit capable of outputting three-phase AC power can be achieved as in the first embodiment. Furthermore, it has also been demonstrated that an inverter circuit capable of outputting multi-phase AC power other than three-phase AC power may be achieved.

Some or all of the above-described embodiments and modifications may also be specified as follows. However, the above-described embodiments and modifications are not limited to the following description.

(1) An inverter circuit including:

a primary-side circuit including a plurality of self-excited oscillator circuits connected to a DC power supply; and a secondary-side circuit configured to output multi-phase AC power having phases different from each other according to oscillation of the plurality of self-excited oscillator circuits; wherein each of the plurality of self-excited oscillator circuits includes:

a power transmission coil;

a resonant capacitor constituting a resonant circuit together with the power transmission coil;

a pair of switching elements connected to the power transmission coil;

a drive coil configured to generate an induced electromotive force having a frequency corresponding to a resonance frequency of the resonant circuit, the drive coil applying a voltage to each control electrode of the pair of switching elements of another self-excited oscillator circuit according to the induced electromotive force; and a phase-shift filter;

the secondary-side circuit includes a plurality of power reception coils, each of which is magnetically coupled to the power transmission coil of each of the plurality of self-excited oscillator circuits;

a voltage is applied to each control electrode of the pair of switching elements from the drive coil of another self-excited oscillator circuit; and the phase of the voltage applied to each of the control electrodes of the pair of switching elements of said another self-excited oscillator circuit is shifted by a phase-shift amount corresponding to a number of phases of the output power for each self-excited oscillator circuit according to at least an action of the phase-shift filter.

(2) The inverter circuit according to (1), wherein a first drive coil of at least one of the plurality of self-excited oscillator circuits is magnetically coupled to the power transmission coil in the same self-excited oscillator circuit, and a first phase-shift filter in the same self-excited oscillator circuit as the first drive coil is provided between the first drive coil and each control electrode of the pair of switching elements of said another self-excited oscillator circuit.

(3) The inverter circuit according to (1) or (2), wherein at least one of the plurality of self-excited oscillator circuits further includes a drive control coil connected in parallel to the power transmission coil or the resonant capacitor in the same self-excited oscillator circuit, or to the power reception coil magnetically coupled to the power transmission coil;

a second drive coil of at least one of the plurality of self-excited oscillator circuits is magnetically coupled to the drive control coil in the same self-excited oscillator circuit; and a second phase-shift filter in the same self-excited oscillator circuit as the second drive coil is provided between the second drive coil and each control electrode of the pair of switching elements of said another self-excited oscillator circuit.

(4) The inverter circuit according to any one of (1) to (3), wherein at least one of the plurality of self-excited oscillator circuits further includes a drive control coil connected in parallel to the power transmission coil or the resonant capacitor in the same self-excited oscillator circuit, or to the power reception coil magnetically coupled to the power transmission coil;

a second drive coil of at least one of the plurality of self-excited oscillator circuits is magnetically coupled to the drive control coil in the same self-excited oscillator circuit; and the phase-shift filter in the same self-excited oscillator circuit as the second drive coil is connected to the drive control coil.

(5) An electric field coupling non-contact power feeding device including the inverter circuit according to any one of (1) to (4).

The invention claimed is:

1. An inverter circuit comprising:

a primary-side circuit including a plurality of self-excited oscillator circuits connected to a DC power supply; and a secondary-side circuit configured to output multi-phase AC power having phases different from each other according to oscillation of the plurality of self-excited oscillator circuits, wherein each of the plurality of self-excited oscillator circuits includes:

a power transmission coil;

a resonant capacitor constituting a resonant circuit together with the power transmission coil;

a pair of switching elements connected to the power transmission coil;

a drive coil configured to generate an induced electromotive force having a frequency corresponding to a resonance frequency of the resonant circuit, wherein the drive coil of a first self-excited oscillation circuit of the plurality of self-excited oscillator circuits applies a first voltage to each control electrode of the pair of switching elements of another self-excited oscillator circuit of the plurality of self-excited oscillator circuits according to the induced electromotive force; and a phase-shift filter, the secondary-side circuit includes a plurality of power reception coils, each of the plurality of power reception coils is magnetically coupled to the power transmission coil of each of the plurality of self-excited oscillator circuits, a second voltage is applied to each control electrode of the pair of switching elements of the first self-excited oscillation circuit from the drive coil of another self-excited oscillator circuit of the plurality of self-excited oscillator circuits, and each of the first and second voltages is shifted by a phase-shift amount corresponding to a number of phases of the multi-phase AC power for a respective self-excited oscillator circuit of the plurality of self-excited oscillator circuits according to at least an action of the phase-shift filter.

2. The inverter circuit according to claim 1, wherein the drive coil of the first self-excited oscillation circuit is magnetically coupled to the power transmission coil of the first self-excited oscillator circuit, and the phase-shift filter of the first self-excited oscillator circuit is provided between the drive coil of the first self-excited oscillator circuit and each control electrode of the pair of switching elements of another self-excited oscillator circuit of the plurality of self-excited oscillator circuits.

3. The inverter circuit according to claim 1, wherein the first self-excited oscillator circuit further includes a drive control coil connected in parallel to the power transmission coil or the resonant capacitor of the first self-excited oscillator circuit, or to the power reception coil magnetically coupled to the power transmission coil of the first self-excited oscillator circuit, the drive coil of the first self-excited oscillator circuit is magnetically coupled to the drive control coil of the first self-excited oscillator circuit, and the phase-shift filter of the first self-excited oscillator circuit is provided between the drive coil of the first self-excited oscillator circuit and each control electrode of the pair of switching elements of another self-excited oscillator circuit of the plurality of self-excited oscillator circuits.

4. The inverter circuit according to claim 1, wherein the first self-excited oscillator circuit further includes a drive control coil connected in parallel to the power transmission coil or the resonant capacitor of the first self-excited oscillator circuit, or to the power reception coil magnetically coupled to the power transmission coil of the first self-excited oscillator circuit, the drive coil of the first self-excited oscillator circuit is magnetically coupled to the drive control coil of the first self-excited oscillator circuit, and the phase-shift filter of the first self-excited oscillator circuit is connected to the drive control coil of the first self-excited oscillator circuit.

5. An electric field coupling non-contact power feeding device including the inverter circuit according to claim 1.

* * * * *